Aug. 26, 1947.  G. E. DATH  2,426,262
RAILROAD DRAFT GEAR FRICTION SHOCK ABSORBING MECHANISM
Filed Aug. 25, 1944
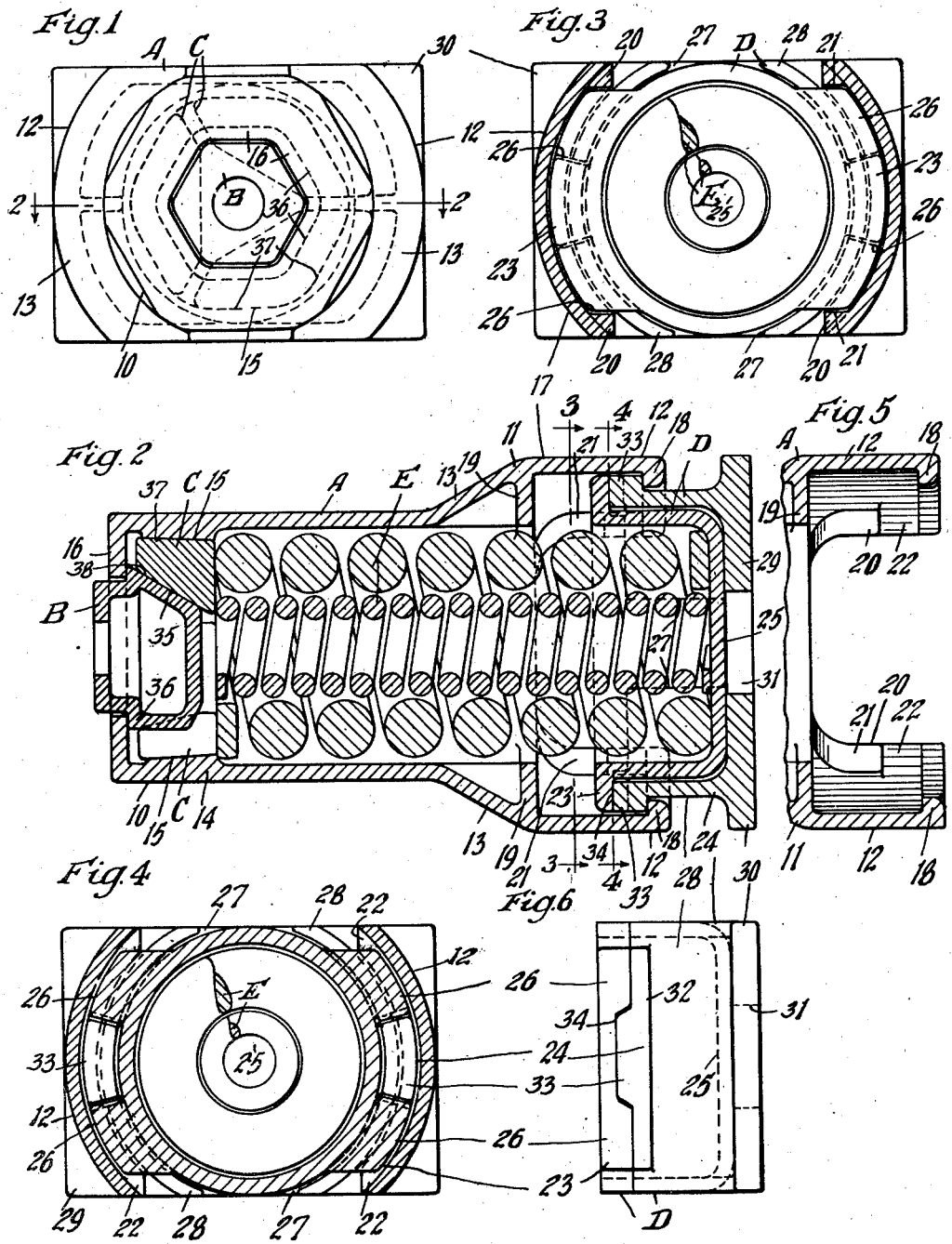
Inventor
George E. Dath
By Henry Fuchs
Atty.

Patented Aug. 26, 1947

2,426,262

UNITED STATES PATENT OFFICE 2,426,262

RAILROAD DRAFT GEAR FRICTION SHOCK ABSORBING MECHANISM

George E. Dath, Mokena, Ill., assignor to W. H. Miner, Inc., Chicago, Ill., a corporation of Delaware Application August 25, 1944, Serial No. 551,205

7 Claims. (Cl. 213—24)

1

This invention relates to improvements in friction shock absorbing mechanism, especially adapted for railway draft riggings.

One object of the invention is to provide a friction shock absorbing mechanism comprising a friction casing open at the front and rear ends, having a friction shell section at the front end thereof; a friction clutch within the friction shell section of the casing, including a wedge and friction shoes, the wedge having shouldered engagement with the casing at the friction shell end thereof to limit outward movement of the wedge, the wedge being insertable through the open rear end of the casing in assembling the mechanism; a spring resistance within the casing yieldingly opposing inward movement of the clutch; and a two-piece spring cap closing the rear end of the casing, wherein the spring cap has restricted movement with respect to the casing to provide for preliminary spring action of the mechanism.

A more specific object of the invention is to provide in the mechanism as set forth in the preceding paragraph, a two-piece, sectional spring cap, the sections of which are separately engageable with the casing by relative rotary displacement of the same and the casing, and are retained in assembled relation with the casing by guide means on the casing holding one of said sections against rotation with respect to the casing and means on said last named section interlocked with the other section for preventing rotation of said other section with respect to the casing.

Other objects of the invention will more clearly appear from the description and claims hereinafter following.

In the drawing forming a part of this specification, Figure 1 is a front elevational view of a friction shock absorbing mechanism, embodying my invention. Figure 2 is a horizontal, longitudinal sectional view, corresponding substantially to the line 2—2 of Figure 1. Figures 3 and 4 are transverse, vertical sectional views, corresponding respectively to the lines 3—3 and 4—4 of Figure 2. Figure 5 is a horizontal, longitudinal sectional view, similar to Figure 2, of the rear end portion only of the casing of the mechanism, all other parts being omitted in said view. Figure 6 is a side elevational view of the two-piece spring cap of the improved mechanism.

As shown in the drawings, my improved friction shock absorbing mechanism comprises broadly a friction casing A; a wedge block B; three friction shoes C—C—C; a two-piece spring cap

2

D comprising two nested cuplike members; and a spring resistance E.

The casing A is in the form of a tubular member open at its front and rear ends. The front end portion 10 of the casing is of hexagonal, transverse cross section, as will be clearly seen from Figure 1. The rear end portion of the casing is enlarged, as indicated at 11, said enlarged portion comprising a pair of side members 12—12, and a frusto-conical section 13 connecting the side members 12 to the hexagonal portion of the casing. At the forward end of the casing, the walls thereof are thickened, as indicated at 14. This thickened portion of the casing forms the friction shell proper of the mechanism. The friction shell section of the casing is provided with three longitudinally extending, interior friction surfaces 15—15—15 of V-shaped, transverse cross section. The friction surfaces 15—15—15 are preferably converged inwardly of the mechanism, thereby providing a tapered friction shell. At the outer end of the friction shell section, that is, forwardly of the friction surfaces 15—15—15, the casing is provided with an inturned retaining flange 16, which is continuous around the casing. The side members 12, at the rear end of the casing, each comprise a vertically extending, curved wall 17 which continues rearwardly from the frusto-conical portion 13 of the casing. At the rear end thereof, each wall 17 has a vertically extending, laterally inturned flange 18 which forms a rear stop on the casing. The flanges 18—18 of the walls 17—17 of the side members 12—12 are in transverse alignment. Interiorly of the casing, at the enlarged portion thereof, are provided transversely disposed, laterally spaced, vertical webs, or ribs, 19—19, which are located at the front ends of the walls 17 of the side members 12 where the same join the frusto-conical portion 13. The spaced arrangement of the webs 19—19 provides an opening therebetween, which is adapted to accommodate the spring resistance E. The wall 17 of each side member 12 is further provided with longitudinally extending, interior, top and bottom flanges or ribs 20—20, which are formed by thickening said walls at the top and bottom end edges thereof. The ribs 20—20 present horizontal longitudinally extending faces 21—21, which together with the inner sides of the walls 17—17 form guideways extending lengthwise of the mechanism. The flanges 20—20 terminate short of the rear ends of the walls 17—17, thus providing openings 22—22 between the flange 18 and the rear ends of the flanges 20—20 to permit assembling of the cuplike members of the spring cap D with the casing A.

The spring cap D comprises nested inner and outer cuplike members 23 and 24. The member 23 is in the form of a cylindrical, tubular sleeve, closed at the outer end by a transverse vertical wall 25. At the front end, the cup 23 is provided with laterally outwardly projecting, relatively thick flanges 26—26, which are at diametrically opposite sides of the cup. The flanges 26 are of a height to fit between the top and bottom flanges 20—20 of the walls 17—17 and have their outer end edges curved concentric to the inner surfaces of the walls 17—17 to fit the same. The flanges 26—26 are thus guided in the guideways of the walls 17—17 to hold the cup 23 against rotation. It is further pointed out that the flanges 26—26 are of such a thickness that they will pass freely edgewise through the openings 22—22 between the rear ends of the flanges 20—20 and the inturned rear flanges 18—18 of said walls.

The member 24 of the cap D is also in the form of a cylindrical sleeve having top and bottom, lengthwise extending openings 27—27. Vertically extending side walls 28—28 are thus provided at opposite sides of the mechanism. The side walls 28—28 extend lengthwise of the device and are curved in vertical direction, being concentric. The opposite end edges of the walls 28—28 are spaced apart at the top and bottom of the member 24, thereby providing the openings 27—27 hereinbefore referred to. The side walls 28—28 are connected by a transverse, outer, vertical end wall 29, which is extended laterally outwardly beyond the side walls to provide flanges 30—30 at opposite sides of the cup member. The wall 29 has a central opening 31 provided for a purpose hereinafter pointed out. At the forward end, the cup member 24 has a pair of laterally outwardly projecting flanges 32—32, which fit the guideways of the walls 17—17 of the side members 12—12 of the casing, and are similar to the flanges 26—26 of the member 23, being of an overall thickness to pass in edgewise direction freely through the openings 22—22 between the rear ends of the flanges 20—20 and the flange 18 of the side member. The cup-shaped member 24 is of larger diameter than the member 23 to accommodate the latter nested therein with the flanges 26—26 thereof bearing on the front faces of the flanges 32—32 of the cup 24. The member 24 has the flanges 32—32 thereof provided with forwardly extending, radial ribs 33—33, which are at diametrically opposite sides of said member and are engaged in seats 34—34 in the flanges 26—26 of the member 23. The seats 34—34 are in the form of radially disposed slots, which are at diametrically opposite sides of the member 23. The ribs 33—33, when seated in the slots 34—34, lock the two cup-shaped members of the cap D together against relative rotation. As shown most clearly in Figure 6, the ribs 33—33 preferably have their opposite side edges beveled off and the side walls of the slots 34—34 are correspondingly beveled to fit the beveled portions of the ribs.

The wedge B is in the form of a hollow block having three inwardly converging wedge faces 35—35—35 arranged symmetrically about the central longitudinal axis of the mechanism. The outer end of the block B extends beyond the front end of the casing and engages the usual main follower of the railway draft rigging. At the outer ends of the wedge faces 35—35—35 of the wedge block B, an annular stop shoulder 36 is provided, which engages in back of the inturned flange 16 of the casing to limit outward movement of the block.

The friction shoes C, which are three in number, are arranged about the wedge block B and have V-shaped, outer friction surfaces 37—37—37, which cooperate with the friction surfaces 15—15—15 of the casing A. On the inner side, each friction shoe is provided with a flat wedge face 38 correspondingly inclined to and engaging one of the wedge faces 35 of the wedge block.

The spring E, which comprises a relatively heavy outer coil and a lighter inner coil is disposed within the casing A and has its front and rear ends bearing respectively on the inner ends of the shoes C—C—C and the transverse wall 25 of the cup member 23 of the two-piece spring cap D.

In assembling the parts of my improved mechanism, the wedge block B, shoes C—C—C, and the spring E are inserted within the casing through the open rear end thereof and the wedge block B is brought into shouldered engagement with the flange 16 at the front end of the casing. The cup member 23 of the cap D is then applied by engaging the flanges 26—26 thereof through the openings 22—22 of the side members 12—12, by rotation of said cup member. The cup member 24 is next applied, the spring resistance E being compressed by a suitable tool, such as an elongated bar, which is engaged through the opening 31 of the member 24 and pressed against the cup 23. The spring E is compressed to a sufficient extent to dispose the flanges 26—26 of the cup member 23 forwardly beyond the openings 22—22 of the side members 12—12. The flanges 32—32 of the cup member 24 are then engaged within the guideways of the side members 12—12 by passing the same through the openings 22—22 in edgewise direction, the cup 24 being rotated. After the cup 24 of the cap D has been turned to a position to align the flanges 32—32 thereof with the guideways of the members 12—12, the pressure is removed from the cup 23, thereby permitting the mechanism to expand and forcing the cups 23 and 24 to the normal position shown in Figure 2, with the flanges 32—32 of the cup 24 shouldered against the flanges 18—18 of the side members 12—12 and the ribs 33—33 of the cup member 24 seated in the slots 34—34 of the cup member 23. As will be evident, the travel rearwardly of the cup member 23 is limited by engagement thereof with the flange of the cup member 24 so that the flanges 26—26 cannot pass beyond the inner end walls of the openings 22—22 of the members 12—12, thus maintaining the flanges 26—26 in operating engagement with the ribs or flanges 20—20 and 20—20 of the members 12—12 and positively preventing rotation of the cup member 23. Inasmuch as the cup member 24 is interlocked against rotation with respect to the cup member 23 by the interengaging ribs 33—33 and slots 34—34 of the cup members, rotation of the cup 24 with respect to the casing is prevented, thereby maintaining the flanges 32—32 thereof in longitudinal alignment with the stop flanges 18—18 of the side members 12—12 of the casing.

The operation of my improved shock absorbing mechanism is as follows: Upon the mechanism being compressed between the front and rear followers of the draft rigging, the pressure exerted on the wedge B wedges the shoes against the friction surfaces of the casing, thereby clutching the casing and causing the same to move lengthwise with the shoes and toward the spring cap D. The spring resistance E is thus compressed during the initial action of the mechanism, thereby providing preliminary spring action. The preliminary spring action of the mechanism continues until relative movement of the cap D and the casing A is limited by engagement of the flanges 26—26 of the cup member 23 with the webs or ribs 19—19 of the casing A and the follower flanges 30—30 of the cup 24 with the inner end of said casing. Upon relative movement of the spring cap D and the casing A being arrested, the friction shoes are forced to move inwardly of the casing during the remainder of the compression stroke of the mechanism, thereby providing high frictional resistance during the last part of the compression stroke.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a casing having a friction shell section at one end; of a two-piece spring cap slidingly telescoped within the other end of the casing, said spring cap comprising a pair of nested cup-shaped members, each cup-shaped member having guide flanges thereon, the flanges of each member of said pair overlying the corresponding flanges of the other member in registering relation; interengaging means on said overlying flanges of said members locking the same against relative rotation; longitudinally extending guideways in said casing slidingly receiving the guide flanges of said members and holding said members against rotation with respect to the casing, said guideways being provided with lateral openings through which the guide flanges of said members may pass freely in edgewise direction; a friction clutch slidingly telescoped within the friction casing; and spring means within the casing extending lengthwise thereof and bearing at opposite ends on said clutch and spring cap respectively to yieldingly oppose movement of said clutch and cap inwardly of the casing.

2. In a friction shock absorbing mechanism, the combination with a casing having a friction shell section at one end; of a two-piece spring cap slidingly telescoped within the other end of the casing, said cap comprising a pair of nested cup-shaped members, each cup-shaped member of said pair having guide flanges thereon, the flanges of each member of said pair registering with the respective flanges of the other member of said pair; interengaging means on said registering flanges of said members for locking said members against relative rotation; a stop shoulder on the casing at said second named end thereof with which the flanges of one of said cup-shaped members is engageable to limit outward movement of said member; spaced, longitudinally extending, interior guideways on said casing at said second named end thereof, each guideway being defined by a pair of longitudinally extending spaced ribs between which one set of registering flanges of said two members of said pair is guided, said ribs terminating short of said stop shoulder, the flanges of each of said members being of a thickness to pass freely edgewise between the ribs and stop shoulder of the casing; a friction clutch slidingly telescoped within the friction shell section of the casing; and spring means within the casing extending lengthwise thereof and bearing at opposite ends on said clutch and spring cap respectively and yieldingly opposing movement of said clutch and cap inwardly of the casing.

3. In a friction shock absorbing mechanism, the combination with a casing having a friction shell section at one end and longitudinally extending, laterally spaced, opposed guide walls at the other end; of longitudinally extending, top and bottom, interior guide ribs on each of said walls; an inturned, vertical stop flange at the outer end of each wall, spaced from the ends of the guide flanges of said wall; a two-piece spring cap comprising a pair of nested cup-shaped members, each cup-shaped member having laterally projecting guide flanges at opposite sides thereof, each of said guide flanges being embraced by and guided between the corresponding top and bottom ribs of said walls, the flanges of one of said members being engageable with said stop flange to limit outward movement of the cap, and the flange of the other member being embraced by said top and bottom guide ribs in all operative positions of said cap, said flanges of each of said cup-shaped members being of a size to pass edgewise freely through the space between the ends of the guide ribs and the stop flange; a locking projection on the flanges of one of said cup members engaged in seats on the flanges of the other cup member to lock said members against relative rotation; a friction clutch slidingly telescoped within the friction casing; and a spring within the casing yieldingly opposing inward movement of said clutch and spring cap respectively.

4. In a friction shock absorbing mechanism, the combination with a casing having a friction shell section at one end provided with an inturned stop flange at its outer end; of a two-piece spring cap slidingly telescoped within the other end of the casing, said cap comprising a pair of nested cup-shaped members; interengaging means on said cup-shaped members for locking same against relative rotation; cooperating guide means on said cup members and casing for guiding the cup members lengthwise of the casing and holding the same against rotation with respect to the casing, comprising a longitudinally extending guideway on said casing and a flange on each cup-shaped member engaged in said guideway; a friction clutch slidingly telescoped within the friction shell section of the casing, said clutch including a wedge block having a shoulder engaging said stop flange on its inner side; and spring means within the casing yieldingly opposing movement of said clutch and spring cap inwardly of the casing toward each other.

5. In a friction shock absorbing mechanism, the combination with a casing having a friction shell section at one end provided with an inturned stop flange at its outer end; of a two-piece spring cap slidingly telescoped within the other end of the casing, said spring cap comprising a pair of nested cup-shaped members, each cup-shaped member having laterally projecting guide flanges thereon, the flanges of one of said members registering respectively with the flanges of the other member to provide registering pairs of flanges; interengaging means on said flanges of each pair of locking said members against relative rotation; longitudinally extending guideways in said casing, each guideway slidingly receiving one of said registering pairs of guide flanges of said members and holding said members against rotation with respect to the casing, each of said guideways being provided with lateral openings through which the individual guide flanges of said members may pass freely in edgewise direction; a friction clutch slidingly telescoped within the friction casing, said clutch including a wedge block adapted to shoulder against the stop flange; and spring means within the casing extending lengthwise thereof and bearing at opposite ends on said clutch and spring cap respectively to yieldingly oppose movement of said clutch and cap inwardly of the casing.

6. In a friction shock absorbing mechanism, the combination with a casing having a friction shell section at one end provided with an inturned stop flange at its outer end; of a two-piece spring cap slidingly telescoped within the other end of the casing, said cap comprising an outer cup-shaped member and an inner cup-shaped member in nested arrangement, each cup-shaped member having a guide flange thereon, said guide flanges of said members being in superimposed registration; interengaging means on said flanges of said members for locking said members against relative rotation; a stop shoulder on the casing at said second named end thereof with which the flange of one of said cup-shaped members is engageable to limit outward movement of said member; spaced, longitudinally extending, interior guide ribs on said casing at said second named end thereof between which the registering flanges of said members are guided, said ribs embracing the flange of said inner cup-shaped member in all operative positions thereof, said ribs terminating short of said stop shoulder, the flange of each of said members being of a thickness to pass freely edgewise between the ribs and stop shoulder of the casing; a friction clutch slidingly telescoped within the friction shell section of the casing, said clutch including a wedge adapted to shoulder against the stop flange; and spring means within the casing extending lengthwise thereof and bearing at opposite ends on said clutch and spring cap respectively and yieldingly opposing movement of said clutch and cap inwardly of the casing.

7. In a friction shock absorbing mechanism, the combination with a casing having a friction shell section at one end provided with an inturned stop flange and longitudinally extending, laterally spaced, opposed guide walls at the other end; of longitudinally extending, top and bottom, interior guide ribs on each of said walls; an inturned, vertical stop flange at the outer end of each wall, spaced from the outer end of one of said guide ribs of each of said walls; a two-piece spring cap comprising a pair of nested cup-shaped members, each cup-shaped member having laterally projecting guide flanges at opposite sides thereof respectively registering with the flanges of the other member and guided between the top and bottom ribs of said walls, the flanges of one of said members being engageable with said stop flange to limit outward movement of the cap, and the flanges of the other member being embraced between said ribs in all operative positions of said cap, said flanges of each of said cup-shaped members being of a size to pass edgewise freely through the space provided between the ends of the guide ribs and the stop flange; a locking projection on the flanges of one of said cup members engaged in seats on the flanges of the other cup member to lock said members against relative rotation; a friction clutch slidingly telescoped within the friction casing, said clutch including a wedge adapted to shoulder against the stop flange of the friction shell section; and a spring within the casing yieldingly opposing inward movement of said clutch and spring cap respectively.

GEORGE E. DATH.

REFERENCES CITED

The following references are of record in the file of this patent:

UNITED STATES PATENTS

| Number | Name | Date |
|---|---|---|
| 1,852,567 | Hazeltine | Apr. 5, 1932 |
| 2,050,541 | Olander | Aug. 11, 1936 |
| 2,076,769 | Dentler | Apr. 13, 1937 |
| 2,354,826 | Olander | Aug. 1, 1944 |

Certificate of Correction

Patent No. 2,426,262.　　　　　　　　　　　　　　　　　　August 26, 1947.

GEORGE E. DATH

It is hereby certified that error appears in the printed specification of the above numbered patent requiring correction as follows: Column 6, line 71, claim 5, before "locking" strike out *of*; and that the said Letters Patent should be read with this correction therein that the same may conform to the record of the case in the Patent Office.

Signed and sealed this 25th day of November, A. D. 1947.

[SEAL]

THOMAS F. MURPHY,
*Assistant Commissioner of Patents.*